United States Patent [19]

Köhler et al.

[11] Patent Number: 5,247,030

[45] Date of Patent: Sep. 21, 1993

[54] ACID MODIFIED POLYARYLENE SULPHIDE

[75] Inventors: Burkhard Köhler; Hans-Detlef Heinz, both of Krefeld; Klaus Reinking, Wermelskirchen, all of Fed. Rep. of Germany

[73] Assignee: Bayer Aktiengesellschaft, Leverkusen, Fed. Rep. of Germany

[21] Appl. No.: 888,258

[22] Filed: May 22, 1992

Related U.S. Application Data

[63] Continuation of Ser. No. 565,129, Aug. 10, 1990, abandoned.

[30] Foreign Application Priority Data

Aug. 22, 1989 [DE] Fed. Rep. of Germany ....... 3927658

[51] Int. Cl.$^5$ .............................................. C08G 75/16
[52] U.S. Cl. ..................................... 525/537; 528/388
[58] Field of Search ......................... 525/537; 528/388

[56] References Cited

FOREIGN PATENT DOCUMENTS 0053344 6/1982 European Pat. Off. .
0193951 9/1986 European Pat. Off. .

Primary Examiner—Harold D. Anderson
Attorney, Agent, or Firm—Connolly and Hutz

[57] ABSTRACT

This invention relates to polyarylene sulphides (PAS), preferably polyphenylene sulphides (PPS), which are modified with carboxyl groups or dicarboxylic acid anhydride groups.

1 Claim, No Drawings

ACID MODIFIED POLYARYLENE SULPHIDE

This application is a continuation of application Ser. No. 07/565,129 filed on Aug. 10, 1990, now abandoned.

This invention relates to polyarylene sulphides (PAS), preferably polyphenylene sulphides (PPS), which are modified with carboxyl groups or dicarboxylic acid anhydride groups.

Polyarylene sulphides containing functional groups are known [e.g. U.S. Pat. No. 3 354 129, Intern. J. Polymeric Mater. 11 (87) 263]. Phenylene sulphide polymers and oligomers containing functional end groups such as carboxyl, nitrile, etc. (telechelates) are also known [e.g. Polymer Bulletin 4 (81) 459, Fr-A 24 70 780, DE-A 34 21 608, DE-A 34 21 610].

The preparation of some of the known polyarylene sulphides modified with functional groups is difficult since it requires a monomer unit containing functional groups to be used directly for the synthesis of the polymer. Such comonomers are liable to render the process of synthesis more difficult and give rise to unwanted side reactions during the reaction or cause contamination of the circulations and effluents of the manufacturing process due to incomplete incorporation in the polymer chain. Processes which enable the polymer to be subsequently modified would therefore be of interest.

This invention relates to reaction products prepared by mixing from 99.9 to 80% by weight, preferably from 99.3 to 95% by weight, of polyarylene sulphides, preferably polyphenylene sulphides which have been obtained by the reaction of a) one or more dihalogenated aromatic compounds corresponding to formula (I), (II) and/or (III)

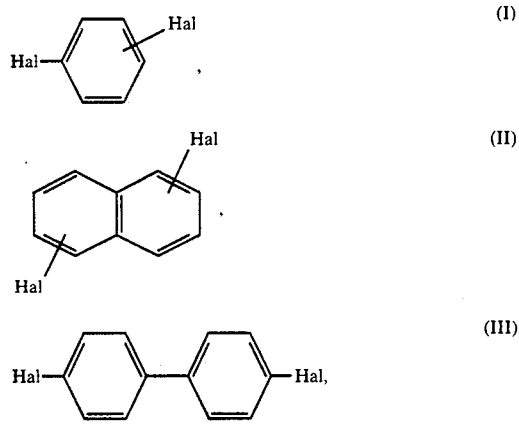

wherein Hal stands for fluorine, chlorine or bromine, preferably chlorine, b) from 0-5 mol-%, based on the sum of the dihalogenated aromatic compounds a), of a tri- or tetrahalogenated aromatic compound corresponding to formula (IV)

$$AR^1Hal_n \quad (IV)$$

wherein $Ar^1$ stands for an aromatic $C_6-C_{14}$-group and Hal stands for fluorine, chlorine or bromine, preferably chlorine, and c) one or more sulphur donors corresponding to formula (V)

$$M_2S \quad (V)$$

wherein M stands for sodium or potassium, the ratio of (a+b):c lying in the range of from 0.75:1 to 1.15:1, d) in an organic solvent preferably N-methylpyrrolidone or N-methylcaprolactam, optionally with the addition of a catalyst, preferably caprolactam, alkali metal carboxylates and/or the alkali metal salts of 6-amino- or 6-methylamino-caproic acid, the molar ratio of c:d being from 1:2 to 1:15, with from 0.1 to 20% by weight preferably from 0.7 to 5% by weight, of carboxyl group-containing or dicarboxylic acid anhydride group-containing aromatic compounds corresponding to formula (VI), (VII), (VIII) or (IX), preferably formula (VI) or (VIII),

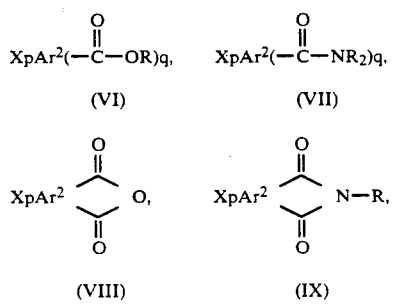

wherein

R stands for a hydrogen atom, a $C_1-C_{12}$-alkyl group, a $C_6-C_{14}$-aryl group or a $C_7-C_{12}$-arylalkyl group, preferably hydrogen, $Ar^2$ stands for an aromatic $C_6-C_{20}$-group, p denotes 1, 2 or 3, preferably 1, q denotes 1, 2 or 3, preferably 1 or 2, and x stands for a nitro group, a sulphonic acid group or an alkali metal sulphonate group, the reaction being preferably carried out under shearing conditions at temperatures from the melting point of the polyarylene sulphide to 450° C.

The reaction may be carried out in (screw shaft) extruders or kneaders.

The following are examples of compounds of formula (VI) according to the invention: 2-, 3- and 4-Nitrobenzoic acid, 5-nitro-isophthalic acid, 2-, 3- and 4-sulphobenzoic acid, 3,5-dinitrobenzoic acid and 5-sulphoisophthalic acid.

The following are examples of compounds of formula (VII): 3- and 4-Sulphophthalic acid anhydride, 3- and 4-nitrophthalic acid anhydride, 4-sulphonaphthalene-1,8- dicarboxylic acid anhydride and 4-nitronaphthalene-1,8-dicarboxylic acid anhydride.

The polyarylene sulphides for component a) are known (e.g. U.S. Pat. No. 3 354 129 and EP-A 171 021) and commercially available, e.g. Ryton[®]and Tedur[®].

Thermoplastic mixtures containing the polyarylene sulphides which have been modified according to the invention may be used for the production of moulded articles.

The reaction products according to the invention are particularly suitable for polyarylene sulphide mixtures which may contain at least 2% by weight of basic fillers such as CaO, $CaCO_3$, $MgCO_3$, $LiCO_3$, $Na_2CO_3$, $K_2CO_3$ or dolomite. They are suitable for use as alloying components for other thermoplasts and other polyarylene sulphides, preferably polyphenylene sulphide.

EXAMPLES

EXAMPLE 1

A mixture of 99% by weight of a polyparaphenylene sulphide PPS having a melt viscosity of 40 Pas (306° C., 1000 1/s) and 1% by weight of 3-sulphobenzoic acid is extruded from a Werner and Pfleiderer ZSK 32 double shaft extruder at 320° C.

EXAMPLE 2

A mixture of 95% by weight of PPS and 5% by weight of 3-sulphobenzoic acid is extruded from a Werner Pfleiderer ZSK 32 double shaft extruder at 320° C.

EXAMPLE 3

98% by weight of PPS are extruded together with 2% by weight of 4-sulphophthalic acid.

EXAMPLE 4

98% by weight of PPS are extruded together with 2% by weight of 4-sulphonaphthalene-1,8-dicarboxylic acid anhydride.

EXAMPLE 5

98% by weight of PPS are extruded together with 2% by weight of 4-nitronaphthalene-1,8-dicarboxylic acid anhydride.

At the most 5% by weight of the quantities of acid or acid anhydride used can be extracted from the reaction products of Examples 1 to 5 with dioxane.

We claim:

1. Reaction product obtained by mixing from 99.9 to 80% by weight of polyarylene sulphide prepared by the reaction of a) one or more dihalogenated aromatic compounds corresponding to formulae (I), (II) or (III)

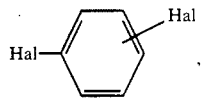  (I)

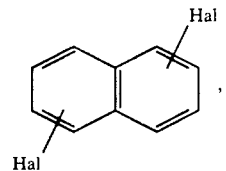  (II)

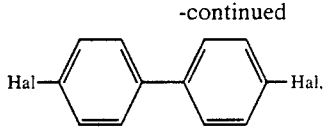  (III)

wherein Hal represents fluorine, chlorine or bromine, b) from 0 to 5 mol-%, based on the sum of the dihalogenated aromatic compounds a), of a tri- or tetra-dihalogenated aromatic compound corresponding to formula (IV)

$$Ar^1Hal_n \qquad (IV)$$

wherein $Ar^1$ represents an aromatic $C_6$–$C_{14}$ group and Hal represents fluorine, chlorine or bromine and c) one or more sulphur donors corresponding to formula (V)

$$M_2S \qquad (V)$$

wherein M represents sodium or potassium and the ration (a+b):c is from 0.75:1 to 1.15:1, d) in an organic solvent, with or without the addition of a catalyst, alkali metal carboxylates or the alkali metal salts of 6-amino- or 6-methyl-amino-caproic acid, the molar ratio of c:d being from 1:2 to 1:15, with from 0.1 to 20% by weight of aromatic compounds containing one or more carboxyl groups or dicarboxylic acid anhydride groups corresponding to formula (VI) or (VIII):

  (VI)

  (VIII)

wherein

R represents a hydrogen atom, a $C_1$–$C_{12}$-alkyl group, a $C_6$–$C_{14}$-aryl group or a $C_7$–$C_{12}$-aralkyl group, $Ar^2$ represents an aromatic $C_6$–$C_{20}$ group, p denotes 1, 2 or 3, q denotes 1, 2 or 3 and x represents a sulphonic acid group, at temperatures from the melting point of the polyarylene sulphide to 450° C.

* * * * *